March 27, 1951 C. R. HAGEN 2,546,185
COTTON PICKER SPINDLE
Filed April 15, 1949
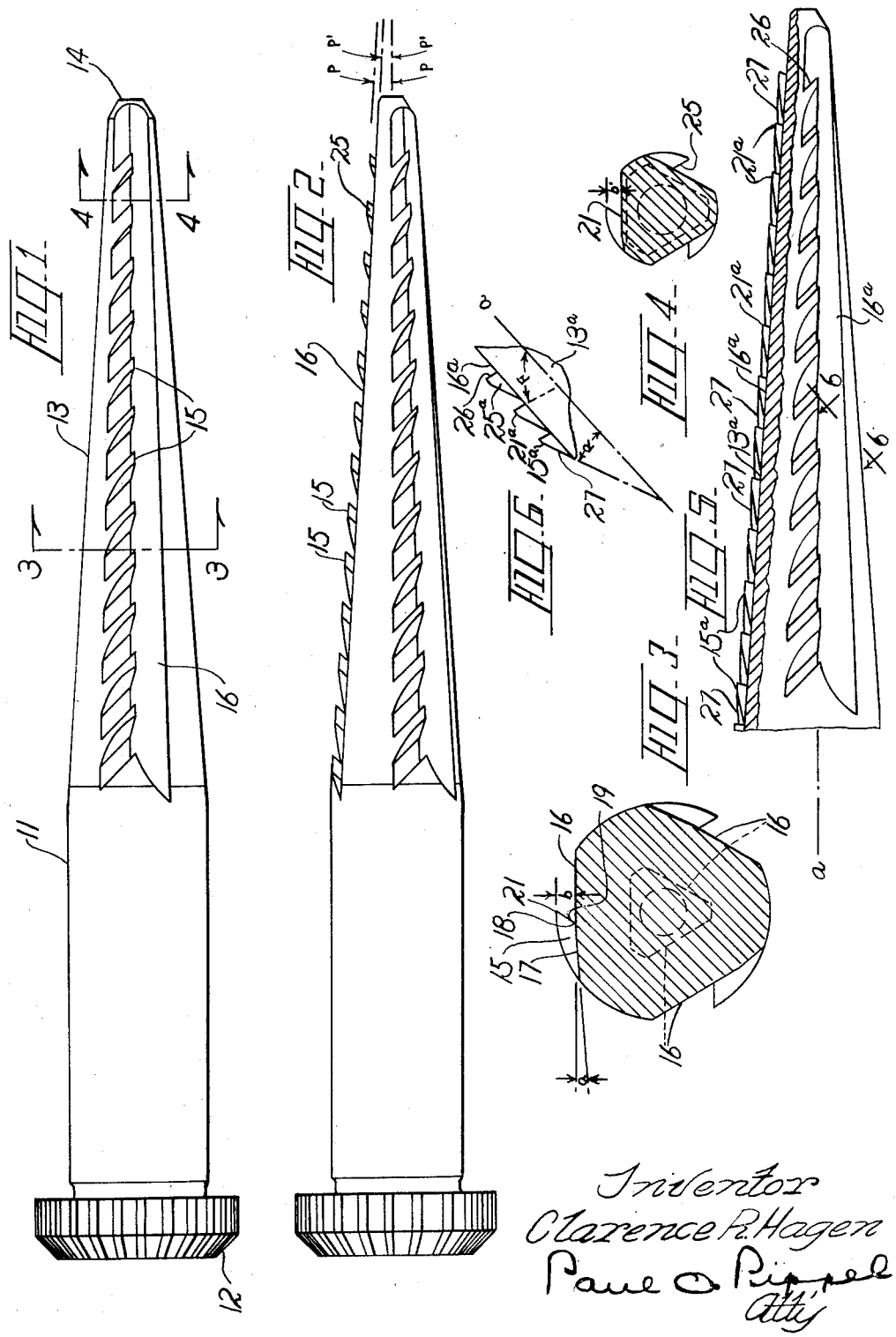
Inventor
Clarence R. Hagen
Paul O. Pippel
Atty Patented Mar. 27, 1951

2,546,185

UNITED STATES PATENT OFFICE 2,546,185

COTTON PICKER SPINDLE

Clarence R. Hagen, Memphis, Tenn., assignor to International Harvester Company, a corporation of New Jersey Application April 15, 1949, Serial No. 87,813

8 Claims. (Cl. 56—50)

This invention concerns cotton picker spindles. More particularly, the invention relates to improvements in spindle barbs for engaging cotton fibers and causing the cotton to be wound onto the spindles pursuant to rotation thereof.

It is recognized in the art of mechanized cotton picking that the aggressiveness of barbed spindles in attaching onto seed cotton and extracting this cotton from the bolls is improved by increasing the length of the barbs radially of their spindles. There is, however, a limit to the amount of aggressiveness attainable by increasing the length of the barbs because the longer barbs correspondingly increase the resistance to doffing the picked cotton from the spindles. The adaptability of the spindles to have the picked cotton doffed or stripped therefrom has been improved by making the barb-bearing portions of the spindles conical and by forming the barbs so that in addition to pointing circumferentially of the conical portion of the spindle, they also point slightly toward the small diameter end thereof. So far as I am aware, in previous spindles wherein the barb-bearing portion tapers toward a small diameter tip of the spindle all of the barbs have been formed identically. I have discovered, however, that barbs formed upon the larger diameter sections of the tapered spindle portion will facilitate doffing equally as effectively as shorter barbs upon the small diameter sections of the tapered portion. This is attributable to the convolutions of cotton fibers wound about the larger diameter sections having greater length circumferentially of the spindle and therefore having a greater overall elongation factor facilitating their stretching sufficiently to be easily slid over the barbs endwise from the spindle. The principal object of this invention is the provision of an improved cotton picker spindle structure wherein there is an elongated barb-bearing element tapering toward an end and having rows of barbs extending lengthwise of this tapering element and graduated in length in an arrangement wherein the barbs of greater length are adjacently to the large diameter end of the tapered element. This results in an improved spindle in the respect of having greater picking aggressiveness without penalizing susceptibility of doffing.

Doffing of the cotton from the barbed picker spindles is expedited by sloping back faces of the barbs so they constitute miniature ramps which guide the convolutions of fibers radially outwardly to the points of the barbs so the fibers can slide over the points endwise of the spindle.

A further object of the invention is the provision of rows of picker barbs having ramp faces upon their rear sides with reference to the small diameter discharge end of the spindle and to graduate the ramp angle of the barbs in each row in such order that the ramp angle is less for the barbs adjacently to the small diameter end of the conical spindle than for the barbs more distantly therefrom. This arrangement provides greater doffing assistance for the inherently more-resistant-to-doffing barbs adjacently to the small diameter end of the spindle.

Other more specific objects inherent in and encompassed by the invention will become apparent from the ensuing description, the appended claims and the annexed drawings, wherein:

Fig. 1 is a side elevational view of a cotton picker spindle embodying a preferred form of this invention.

Fig. 2 is a side elevational view of the spindle of Fig. 1 but shown rotated 90°.

Fig. 3 is a transverse sectional view taken on the line 3—3 of Fig. 1.

Fig. 4 is a transverse sectional view taken on the line 4—4 of Fig. 1.

Fig. 5 is a fragmentary side elevational view of a cotton picker spindle having barbs of modified formation, the view being partly in section.

Fig. 6 is a fragmentary view taken on a plane arranged perpendicularly to the front and back faces of certain of the spindle barbs as indicated by the line 6—6 in Fig. 5.

The spindle illustrated in the drawings is conventional excepting for the specific type of barb formation thereon and the disposition of elongated facets extending lengthwise of the conical part of the spindle respective adjacently to each row of barbs. This spindle has a cylindrical bearing portion 11 adapted to be supported within a conventional bushing, not shown. A bevel gear 12 is formed at one end of the bearing 11 and a barb-bearing portion 13, tapering toward an end 14 of the spindle, is formed at the opposite end of such bearing. In forming barbs 15 upon the conical tapered spindle portion 13, three elongated circumferentially spaced facets 16 are first formed, preferably by a broaching operation. The pitch of the longitudinal surface elements in the conical spindle portion with reference to the principal axis of the spindle is represented by the angle ($p$) in Fig. 2. The corresponding pitch angle in the facets 16 is shown at ($p'$) and this angle is slightly less than the angle ($p$) wherefor the facets extend more deeply into the conical surface at the large diameter end of the conical portion 13 than at the small diameter end thereof.

After formation of the facets 16 one of the rows of barbs 15 is formed by effecting a plurality of laterally spaced cuts in the body of the spindle adjacently to one of the facets 16. These cuts are preferably formed by a broaching operation and the line of movement of the broaching tool is disposed at an angle (a), approximately 3°, with respect to the adjacent facet 16 as illustrated in Fig. 3. Broaching between the barbs 15 is continued until the bottoms 17 of the broaching grooves descend radially of the spindle to a line 18 (seen as a point in Fig. 3) intersecting the base of the barbs 15 and extending along an edge of the adjacent facet 16. The broaching cuts used in forming the facets 16 are formed in a manner to be bounded on one side by an overhanging ledge coinciding with end faces 19 of the barbs so that subsequent to formation of the barbs, the points 21 thereof overhang their associated facet 16. Said points 21 of the barbs coincide with the circular periphery of the transverse section of the conical element 13 respectively occupied by such barbs as viewed in Figs. 3 and 4.

Subsequent to cutting the barbs adjacently to one of the grooves 16 the spindle will be rotated 120° for adapting broaching of the barbs along another of said facets, and thereafter will be rotated another 120° to facilitate formation of the third row of barbs.

By reference to Figs. 3 and 4 and comparing the two sections of the barb-bearing tapered portion 13 of the spindle, it can be seen that the radial length (b) of the barbs at section 3—3 in Fig. 1, is greater than the corresponding length (b') at the section 4—4 in Fig. 1. This is because the points 21 of the barbs coincide with the circular periphery of the transverse conical sections at which they are disposed while the bottoms of the barbs are in a plane common to their associated facet 16 which enters more deeply radially into the conical barb-bearing portion as it approaches the large diameter end thereof. The radial height corresponding to the dimension (b') of the barbs at the smallest diameter section of the tapered barb-bearing portion 13 is approximately 55% of the radial height corresponding to the dimension (b) at the largest diameter section of the element 13. This enables the barbs at the large diameter section to be more aggressive in their cotton picking action than the barbs at the tip of the spindle. There is a graduated value in the picking aggressiveness of the barbs according to their position lengthwise of the spindle. The barbs at the small diameter end of the spindle tapered portion are made as long radially of the spindle as they can be without interfering with doffing of the picked cotton therefrom. This is also true of the barbs at the large diameter end of the barb-bearing tapered portion, but it is possible to make the barbs longer at the sections of the large diameter because the convolutions of cotton fiber wrapped thereabout are susceptible to being stretched farther to slip over the spindles when being doffed. By graduating the height of the barbs according to their position from the small diameter end of the spindle, each of the barbs is caused to be of maximum aggressiveness possible without frustrating doffing.

Referring now to Figs. 5 and 6, the modification there shown comprises a conical barb-bearing element 13a corresponding to the element 13 of the first embodiment, and longitudinal rows of barbs 15a corresponding to the barbs 15. A longitudinal facet 16a is disposed alongside of each row of barbs 15a and these facets 16a extend more deeply into the conical spindle adjacently to the large diameter end thereof than at the small diameter end similarly to the facets 16 wherefor points 21a of the barbs 15a in each row have graduated spacing radially of the spindle from the facets.

The end face 25a of each bar 15a is undercut similarly to the corresponding end faces 25 of the barbs 15 wherefor the barb points 21a overhand their respectively associated facets 16a. Front faces 26 of the barbs 15a are also undercut to form an obtuse angle F with the principal axis "a" of the spindle. Undercutting the front faces 26 and the end faces 25a of the barbs 15a tends to increase the sharpness of the points 21a and correspondingly increases the aggressiveness of the spindle. The back faces, 27, of the barbs 15a constitute ramps which serve for guiding and expedite expansion of the convolutions of picked cotton fibers pursuant to doffing. The ramp angle, that is, the angle between the ramp faces 27 and the principal axis "a" of the spindle is designated R in Fig. 6. In Fig. 5 it can be seen that the ramp angle of the armp faces 27 adjacently to the small diameter end of the spindle is less than the ramp angle of the faces 27 adjacently to the large diameter end of the spindle.

The smaller the ramp angle the more facile is the ramp face in the doffing operation. Inasmuch as the barbs adjacently to the small diameter end of th spindle are inherently more resistant to doffing, the smaller ramp angle of the ramp faces on these barbs tends to equalize the doffing characteristics of the spind'e barbs.

Having described a limited number of preferred forms of the invention with the view of clearly and concisely illustrating such invention, I claim:

1. A cotton picker spindle comprising an elongated body for rotation about its principal axis and having a barb-bearing surface tapering toward an end thereof, circumferentially spaced rows of picker barbs arranged lengthwise upon said tapered surface, said barbs having respective points spaced radially of said body from said surface and projecting tranversely of said body in the same circumferential direction with respect to such body, and the distance of such radial spacing of the barb points in each row being graduated in an arrangement wherein the distance of such radial spacing increases in accordance with the distance of the points from said end of the body.

2. In a cotton picker spind'e structure, an elongated barb-bearing element tapering toward an end thereof, said element having a plurality of elongated circumferentially-spaced facets extending lengthwise thereof, and rows of barbs extending lengthwise of and respectively along said facets, said barbs being directed circumferentially of said element and having points spaced radially of the element from their respectively associated facets, the distance of such spacing of the barb points from their associated facets being graduated in each row, and such spacing distance of the barb points constituting a direct function of their distance from said end of the tapered element.

3. A cotton picker spindle comprising an elongated body coaxial with the principal axis of the spindle and tapering toward a small diameter end of such spindle, a plurality of elongated circumferentially spaced facets upon and extending lengthwise of said body, rows of barbs upon and extending lengthwise of the body respectively alongside of said facets, said facets having a pitch angle with reference to the spindle axis, and the points of the teeth in each row of barbs coinciding with a line having a pitch angle with similar reference to the spindle axis but exceeding the pitch angle of said facets, wherefore the barbs project from said facets more distantly radially of the spindle according to their distance from the small diameter end of the element.

4. A barb-bearing cotton picker spindle which is elongated and tapers toward a small diameter end thereof, said spindle having a plurality of elongated facets extending lengthwise thereof and spaced apart circumferentially thereof, said spindle having rows of barbs extending lengthwise of and respectively at one side of said facets, said barbs having points overhanging their associated facets radially of the spindle, and the distance of the barb points radially of the spindle from their associated facets being in accordance with the circumferential extent of the spindle at the transverse section occupied by their respective barbs.

5. A conical barb-bearing cotton picker spindle having a plurality of elongated facets spaced apart circumferentially thereof and extending lengthwise thereof, said spindle having rows of picker barbs extending lengthwise thereof respectively alongside of said facets, each of said barbs having a point coinciding with the circular periphery of the transverse section of the spindle occupied thereby, said barb points overhanging their associated facets whereby the radial extent of the barbs is determined by the depth of the facets radially of the spindle, and said facets increasing in depth as they extend lengthwise of the spindle away from the small diameter end thereof to cause graduation in the radial extent of the barbs in each row.

6. In a cotton picker spindle structure, an elongated barb-bearing element tapering toward an end thereof, said element having a plurality of elongated circumferentially-spaced facets extending lengthwise thereof, and rows of barbs extending lengthwise of and respectively along said facets, said barbs being directed in the same direction circumferentially of said element and in the same direction somewhat endwise of the element toward the small diameter end thereof, each of said barbs having a point spaced radially of the element from its associated facet, each barb having an end face intersecting and forming an acute angle with the associated facet, each barb also having a ramp face upon a back side thereof and disposed at an acute ramp angle with respect to the principal axis of such element, the radial spacing of the barb points from their associated facets being graduated in each row of barbs in such order that such spacing is a direct function of the distance of their barbs from the small diameter end of the tapered element.

7. The combination set forth in claim 6, wherein the ramp angles of the ramp faces in each row of barbs are graduated in size according to the position of their associated barbs lengthwise of the barb-bearing element and the angle being smaller upon the barbs adjacently to the smaller diameter end of such element.

8. The combination set forth in claim 6, wherein each barb also has an undercut front face disposed oppositely from its ramp face.

CLARENCE R. HAGEN.

REFERENCES CITED

The following references are of record in the file of this patent:

UNITED STATES PATENTS

| Number | Name | Date |
|---|---|---|
| 685,439 | Campbell | Oct. 29, 1901 |
| 840,367 | Piper | Jan. 1, 1907 |
| 908,638 | Appleby | Jan. 5, 1909 |
| 1,088,703 | Ivey | Mar. 3, 1914 |
| 1,262,031 | Fisher | Apr. 9, 1918 |